United States Patent [19]

Geerts

[11] Patent Number: 4,909,373
[45] Date of Patent: Mar. 20, 1990

[54] OVERHEAD CONVEYOR

[76] Inventor: Johannes G. C. Geerts, Westerduinweg 32, 2116 VH Bentveld, Netherlands

[21] Appl. No.: 242,311

[22] Filed: Sep. 9, 1988

[30] Foreign Application Priority Data

Sep. 10, 1987 [NL] Netherlands ............... 8702159

[51] Int. Cl.⁴ .............................................. B65G 47/46
[52] U.S. Cl. .................................... 198/365; 198/360; 198/367; 198/465.4; 198/486.1
[58] Field of Search .............. 198/360, 365, 367, 370, 198/465.4, 477.1, 486.1, 680, 637

[56] References Cited

U.S. PATENT DOCUMENTS

| | | | |
|---|---|---|---|
| 2,947,407 | 8/1960 | Wood | 198/360 |
| 3,151,730 | 10/1964 | Bunten | 198/680 |
| 3,247,952 | 4/1966 | Kozlosky | 198/360 |
| 3,343,648 | 9/1967 | Rakel . | |
| 3,499,518 | 3/1970 | Goodpaster | 198/465.4 |
| 3,580,378 | 5/1971 | Pedersen | 198/465.4 |
| 4,114,538 | 9/1978 | Nicodemus et al. | 198/680 |

FOREIGN PATENT DOCUMENTS

1482519  8/1977  United Kingdom ............ 198/465.4

*Primary Examiner*—Joseph E. Valenza
*Attorney, Agent, or Firm*—Lalos & Keegan

[57] ABSTRACT

An overhead conveyor comprising an endless draw member travelling along a closed stretch and containing regularly spaced claws in which a carrier hook such as a coat-hanger can be suspended, each claw being capable of closing and opening for carrying or dropping a hook. The conveyor is further provided with throw-off stations, positioned along its stretch, a number of stations comprising a catching rail movable between an active and in inoperative position. In its active position the rail can receive a hook, dropped by an open claw. In its inoperative position the travelling claws with a hook are able to pass through the concerning throw-off station.

5 Claims, 7 Drawing Sheets

OVERHEAD CONVEYOR

BACKGROUND OF THE INVENTION

The invention relates to an overhead conveyer comprising an endless draw member traveling along a stretch, said member being provided with pick up claws mounted at regular distances between them, which claws can be adjusted from an active (closed) position to a non-operative (open) position and vice versa for transporting or dropping respectively of a carrier hook suspended in a claw, the hook being of the type in which one side is closed such as a coat-hanger, which conveyer comprises a number of throw off stations each being provided with means for opening a passing claw, each of said stations further being provided with a catching rail mounted in a diverging manner as seen in the direction of travel, the tongue at the free end of the rail lying under the path traversed by each of the claws at least during the throw off operation.

Such a conveyer is known in practice and serves for sorting out garments suspended on a carrier hook or coathanger. These coat-hangers are supplied at a feed station and should be selectively discharged at a number of throw off stations. The catching rails used in that known conveyer can only be present on one border or bank of the conveyer, viz. the border to which the open side of each carrier hook is directed. The application of catching rails on the opposite border of the conveyer is impossible, as the carrier hooks would then jam on that rail. Until now one has accepted this limitation which however is not conducive for the compactness of the installation.

The invention aims at furnishing a provision with which carrier hooks with garments may also be discharged towards the opposite border of the conveyer at the location of one or more throw off stations. According to the invention this aim is realized in that the tongue of the free end of one or more catching rails is displaceable between two positions: the catching position (A) in which the tongue of the free end is lying within the path of the carrier hook and a discharge position (B) in which the tongue is lying completely outside the path of the carrier hook.

Due to this feature, the pick up claws comprising a carrier hook are capable of passing along said catching rails. The tongue of this rail only enters into the path of the carrier hook after its displacement into the catching position. Upon the activation of the means for opening a passing claw near that station, the carrier hook can be freed from the claw and will fall along a short distance downwards in order to be caught by the tongue of the catching rail. Hereafter this tongue will be displaced to the discharge position. In this position the following pick up claws of the conveyer are able to pass without disturbance (jamming) while the catched carrier hook is able to slip along the concerning catching rail towards its destination.

Preferably the displacement of the tongue at the free end of each movable catching rail from its catching position towards its discharge position comprises not only a sideward component, but also an upward component. Due to this feature, the catched carrier hook can more easily slip by means of gravity along the concerning catching rail. Moreover one obtains that during a quick displacement of the free end of the concerning catching rail, a risk exist that this rail, due to occuring inertia forces is —as it were— pulled out under the carrier hook without taking along this hook (with the garment).

The features discussed in the preceeding portion of this specification, as well as further particularities of the overhead conveyer according to the invention, will be explained more in detail with the aid of the accompanying drawings which give a schematic picture of this conveyor and of the most important parts therefrom.

BRIEF DESCRIPTION OF THE DRAWINGS

The FIGS. 3 and 4 show on an enlarged scale a vertical section of the conveyer according to the lines III—III and IV—IV resp. in FIG. 1.

The FIGS. 8 and 9 show two embodiments of a mechanism with which the free end of an catching rail can be displaced between the catching position and the discharge position and vice versa.

DETAILED DESCRIPTION

Figure 1:
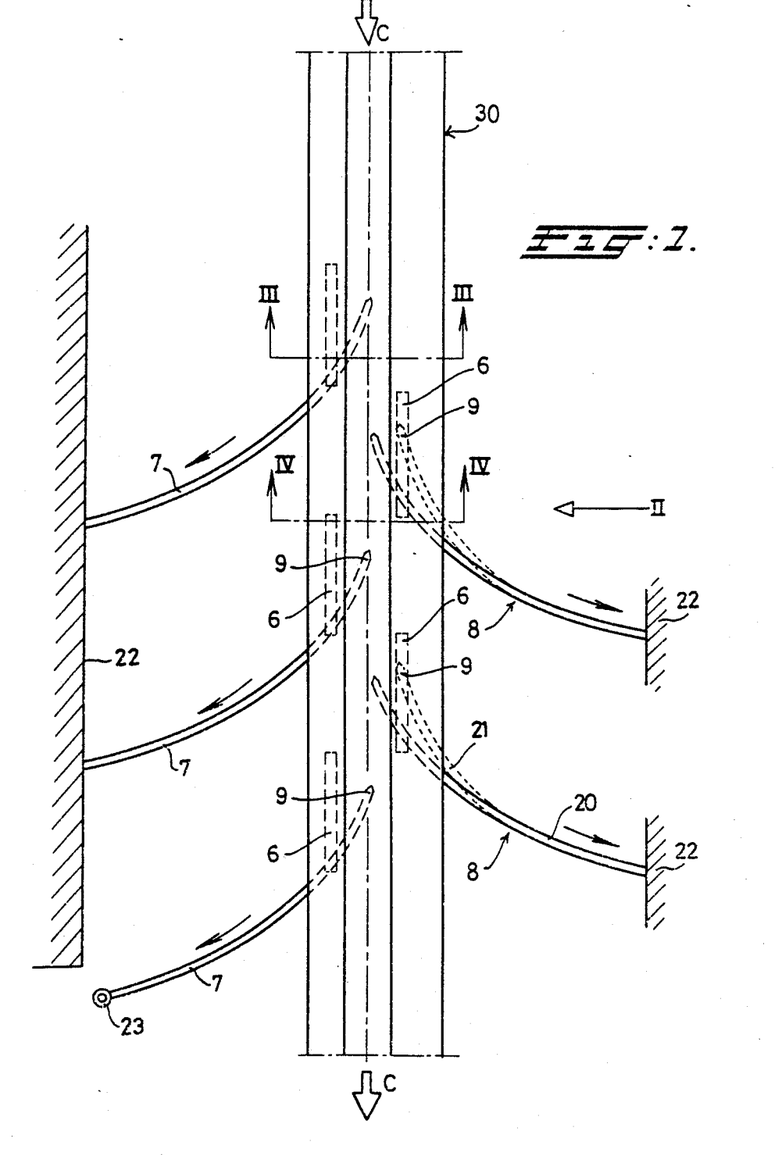
FIG. 1 is a plane view of the conveyer.
Figure 2:
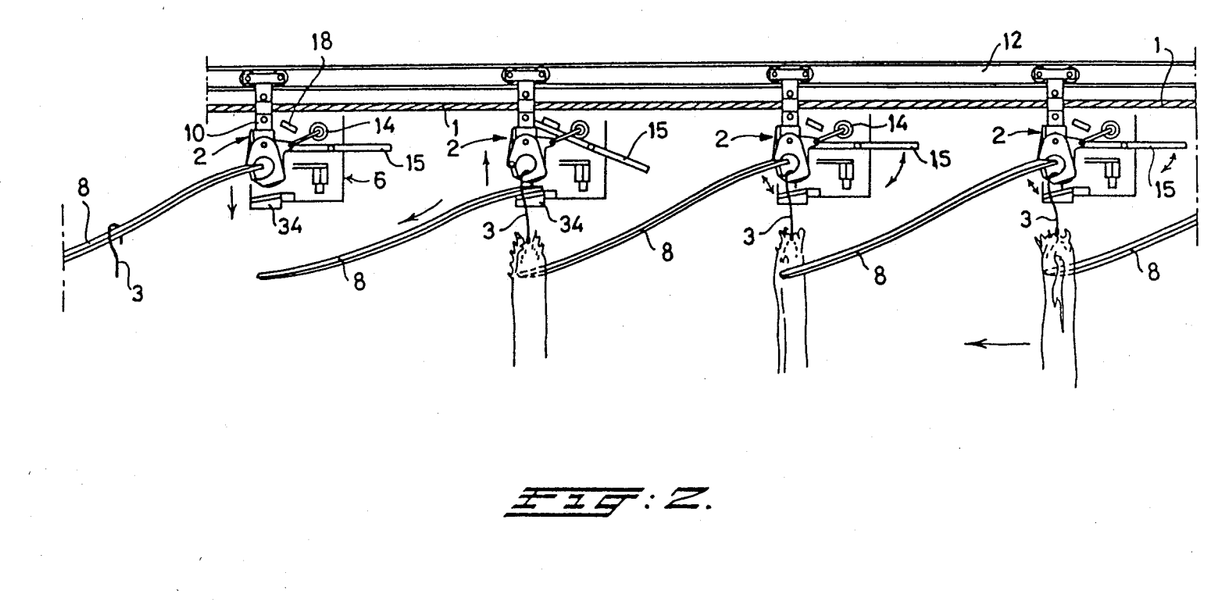
FIG. 2 is a front view of the conveyer according to the line II in FIG. 1.
Figure 3:
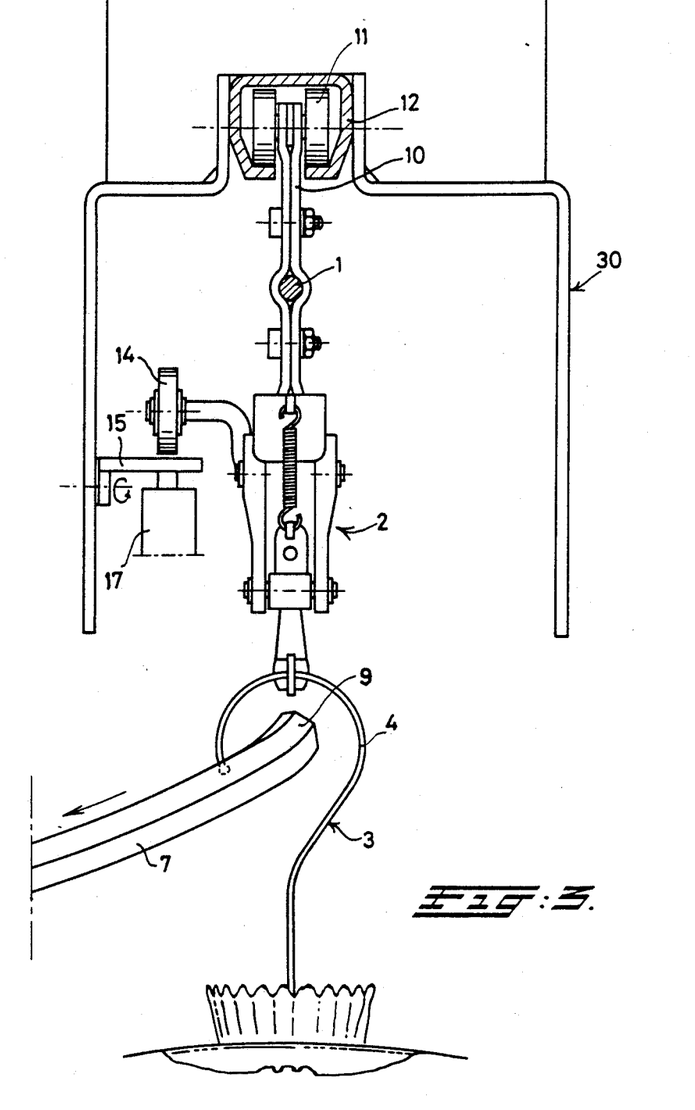
Figure 7:
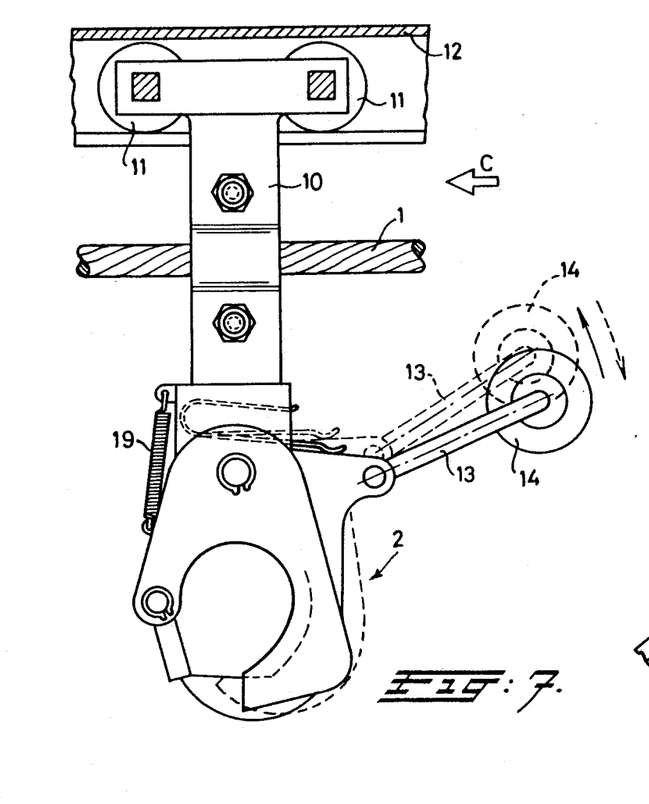
FIG. 7 shows a pick up claw in its active (closed) position thereby showing in dotted lines the inoperative (open) position.

As shown in FIGS. 1, 2 and 3, the overhead conveyer consists of an endless draw member 1 capable of traveling along a stretch. This member 1 is provided with pick up claws 2 spaced at regular distances from each other. These claws can be adjusted from an active (closed) position towards an inoperative (open) position and vice versa, as shown in FIG. 7. In each claw 2 a carrier hook 3 may be taken up, vide FIG. 3. This hook 3 is of the type in which one side viz. the portion 4 is closed such as a coat-hanger. Opposite the closed portion 4 there is an open portion 5. Both portions 4 and 5 play an important role in the present conveyer.

The conveyer is provided with a number of throw off stations 6 which are shown rather elementary in the FIG. 1 and 2. These stations 6 however will be described more detailed by means of the FIGS. 5 and 6. At the location of each throw off station 6 the conveyer is provided with a catching rail 7 or 8 in a diverging position as seen in the direction of travel C. The rails 7 belong, together with the conveyer as described uptil now, to the state of the art, whereas the catching rails 8 form part of the invention now to be described. Every rail 7, 8 is provided with a tongue 9 at its free end. The tongues of the rail 7 are permanently lying under the path traversed by the claws 2. The tongues 9 of the rails 8 are lying besides the path traversed by the claws, as indicated in dotted lines. These tongues 9 however can also be displaced towards a position under this path (shown in full lines in FIG. 1) in a manner which will be explained later on. In the embodiment of the conveyer as here described, the carrier hooks 3 serve for carrying a garment which must be selected towards one of the throw off stations 6.

As shown in FIG. 7 each pick up claw 2 is suspended on a T-shaped member 10, the middle portion of which is clenched upon the endless draw member 1, vide also FIG. 3. The member 10 carries two sets of rollers 11 which are guided in a reversed gutter-shaped carrying profile beam 12. The pick up claw 2 is shown in its active (closed) position and is represented by dotted lines in its inoperative (open) position. These two positions are determined by means of a lever 13 carrying a roll 14 at its end. This roll 14 passes during the travel of the conveyer closely above a horizontally directed lath 15 in each throw off station 6 (vide also FIG. 2). The lath 15 is tiltable around a pivot 16 as is more clearly visible in FIG. 5. In the inclined position of the lath 15, the passing roll 14 is moved upwardly which consequently opens the concerning pick up claw 1.

Figure 5:
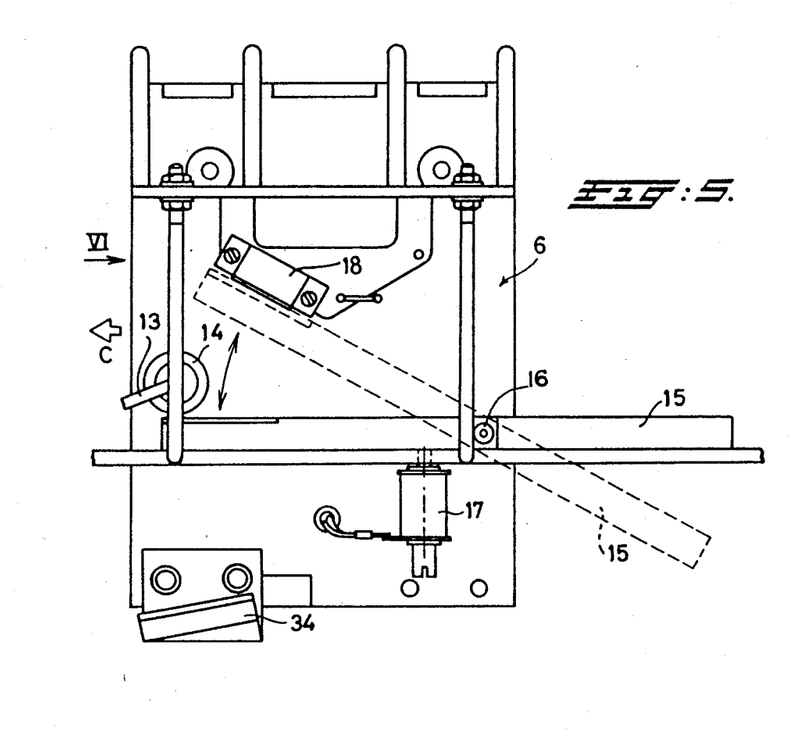
FIG. 5 is a front view of a throw off station.
Figure 6:
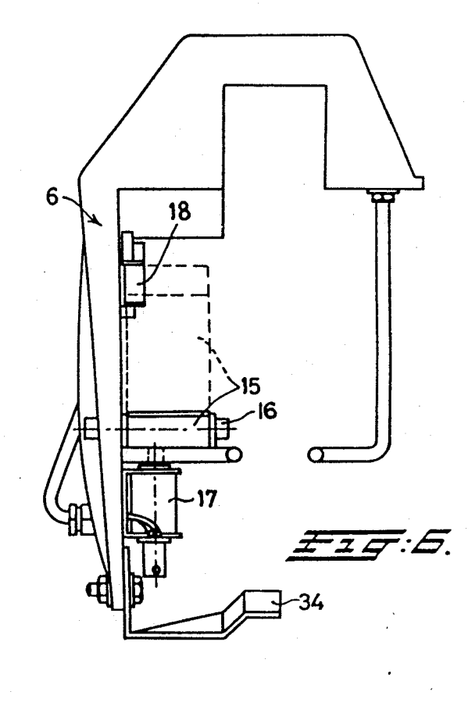
FIG. 6 is a side view of this station according to the arrow VI in FIG. 5.

FIGS. 5 and 6 show a throw off station 6 in which the lath 15 has an horizontal position. A pneumatic push member 17 is capable after energizing to tilt the lath 15 towards the inclined position represented in dotted lines. The energizing occurs along electronic way for instance by means of a programmed computer (conventional). A magnet 18 holds the lath 15 in this inclined position. The operating roll 14 from the first coming passing pick up claw 2 will be somewhat lifted towards the position shown in dotted lines in FIG. 7. This means that the claw is opened and the carrier hook 3 which is present, can fall downwards and will be catched by a tongue 9 lying here under, said tongue belonging to the concerning throw off station 6. The roll 14 subsequently pushes the lath 15 once again free from the magnet 18 so that the lath falls back to its horizontal position. A tension spring 19 in the pick up claw 2 (vide FIG. 7) brings this claw back from its open position towards its closed position.

The particular feature of the overhead conveyer as described uptil now, is lying in the addition of the throw off stations 6 and the catching rails 8 at the right hand border in FIG. 1 of the conveyer. At that side the carrier hook 3 is closed (vide FIG. 2–4) so that uptil now there was no possibility to discharge from said right hand border the carrier hooks with the product (garments) suspended there upon by means of fixed catching rails of the type applied at the left hand border in FIG. 1. The catching rails 8 are distinguished in that the tongue 9 at the free end is displaceable between two position: the catching position A (shown in full lines) in which the tongue 9 is lying within the path traversed by the carrier hooks 3 and the discharged position B (shown in dotted lines) in which the tongue lies completely beyond the path of the carrier hooks 3. This opens the possibility to increase the number of throw off stations 6 for a same length of the stretch of the conveyer.

Figure 4:
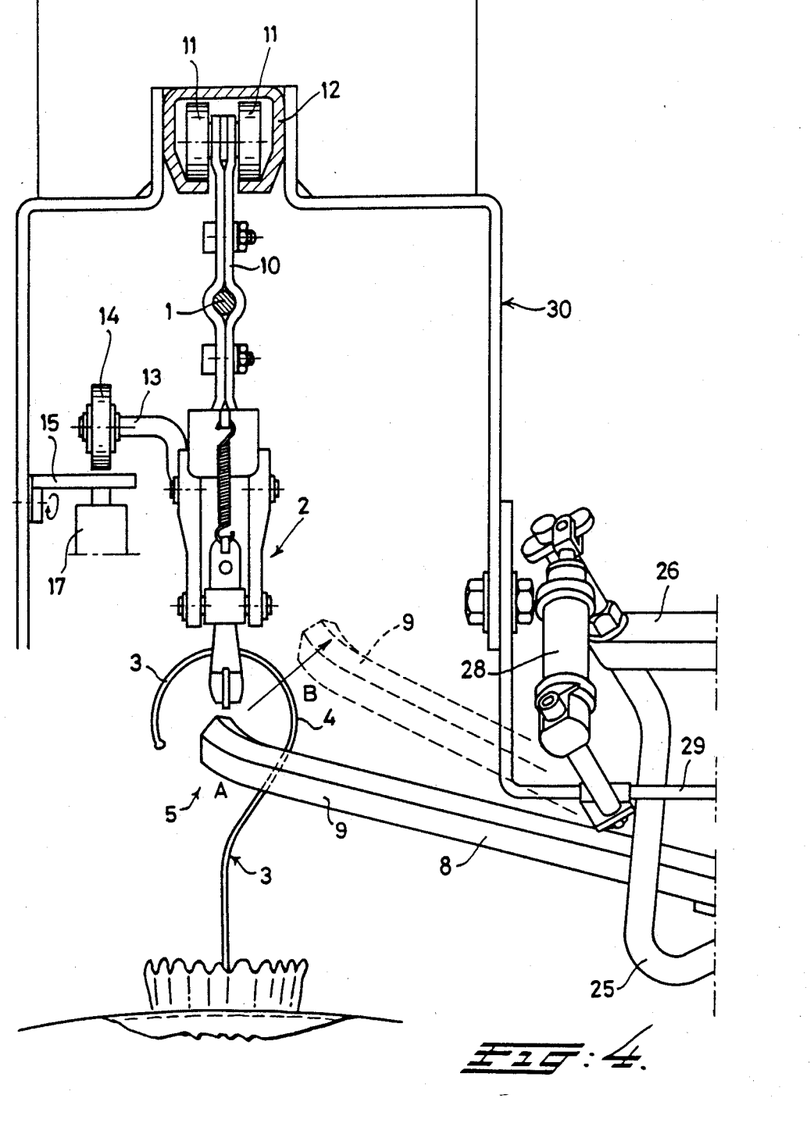

The position of the tongue 9 at the free end of each movable catching rail 8 from a catching position A to the discharge position B not only comprises a sideward component but also an upward component as is most clearly visible in FIG. . 4. Every movable catching rail 8 is composed to this end from a fixed bar portion 20 and a movable bar portion 21. The fixed bar portions are mounted against a wall 22 (FIG. 1) as this is also the case with the fixed catching rails 7. The left lower side of FIG. 1 shows that the rails 7 may also be mounted upon a support structure 23 shown schematically.

It goes without saying that the same holds good for the fixed bar portion 20 of the movable catching rails 8. The two bar portions 20 and 21 are provided with a continuous flexible plastic profile 24 (vide FIG. 8) which forms a hinge between both bar portions lying at some distance from each other and allowing horizontal and vertical displacement of the movable bar portion 21. The movable bar portion 21 thereby constitutes the tongue 9 at the free end of the catching rail 8. The upwardly directed component during the displacement of the tongue 9 between the catching position A and the discharge position B aims at avoiding an unvoluntarily slipping off of the carrier hook 3. It also serves to simulate that the carrier hook landed from the open claw 2 upon the catching rail 8, can slip as quickly as possible in the direction of the wall 22 or of the support structure 23.

Figure 8:
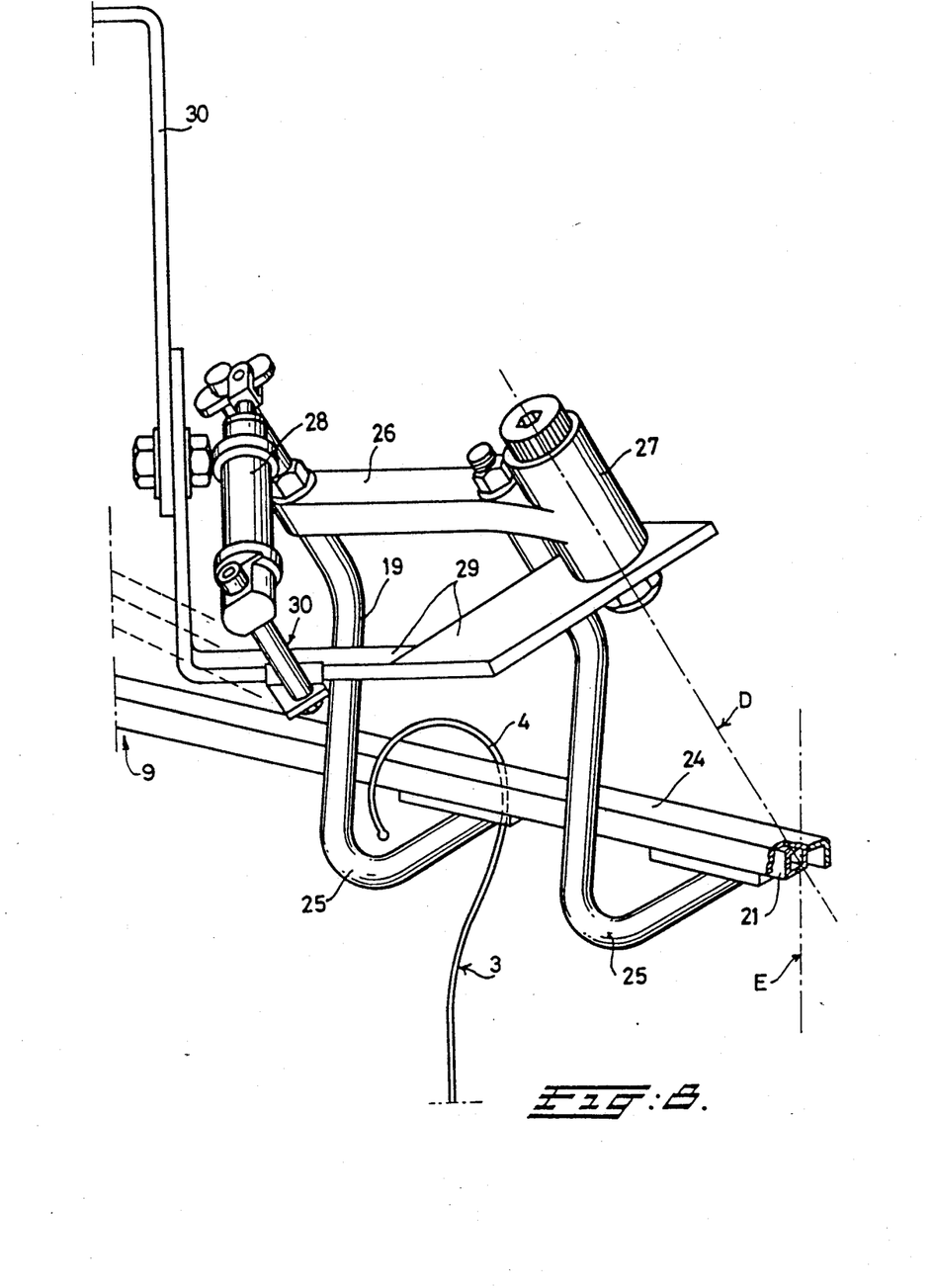
Figure 9:
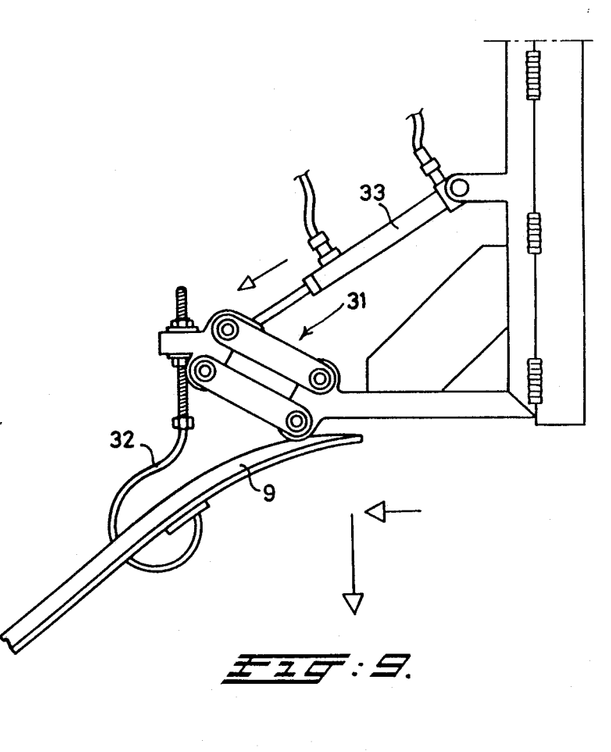

Two embodiments of the mechanism for the displacement of the tongue 9 of the catching rails 8 between the positions A and B and vice versa are shown in the FIGS. 8 and 9. According to FIG. 8 the tongue 9 at the free end of the movable catching rail 8 is mounted at the end of two braces 25. The other ends of these braces are mounted upon a common arm 26 pivotable around a shaft 27. The axis D of this shaft cuts the pivotal portion of the concerning catching rail under an angle with the vertical E. The operation occurs by means of a pneumatic cylinder 28 which is energized simultaneously with the pushing member 17 of the concerning throw off station. The shaft 27 and the cylinder 28 are supported upon an extension 29 of the frame 30 of the conveyer. FIG. 8 shows that the carrier hook 3 catched by the tongue 9 can slip unhindered along the plastic profile 24. The angle between the lines D and E causes the aimed upward component during the movement of the tongue 9 from its catching position A to its discharge position B.

In the embodiment according to FIG. 9 the tongue 9 at the free end of the movable catching rail 8 is mounted upon a pivotal parallelogram linkage 31 through a single brace 32. A pneumatic actuating cylinder 33 has the same function as the cylinder 28 in the embodiment according to FIG. 8. The tongue 9 can in this way perform a displacement with a horizontal and a vertical component as described in the preceding paragraph. Finally, FIGS. 5 and 6 further show a saddle 34 which may be applied for supporting the tongue 9 when it reaches the catching position A. In this manner even heavy loads may be suspended on a carrier hook 3 and may be discharged towards a movable catching rail 8 without any noticeable sagging (bouncing or swishing) of this rail.

I claim:

1. An overhead conveyer comprising an endless draw member traveling along a stretch, said member being provided with pick up claws mounted at regular distances from each other, which claws can be selectively adjusted between closed and open positions for transporting or dropping respectively a carrier hook suspended in a claw in transverse position relative to the direction of travel of the conveyer, the carrier hook being of the type in which one side is closed and the other side being open and having a beak, said conveyer further comprising a number of throw off stations each being provided with means for opening a passing claw, each of said stations on the side of the conveyer toward which the beak of the hook is facing will further comprise a stationary rail having a tongue reaching into the path of travel of the carrier hook, and each of said stations on the opposite side comprising an adjustable rail having a tongue which is selectively displaceable between a catching and an inactive position, the catching position being when the free end of the tongue is lying within the path of the carrier hook, said inactive position being when the tongue is lying completely outside the path of the carrier hook.

2. A conveyer according to claim 1 characterized in that the displacement of the tongue at the free end of each movable catching rail (8) from its catching position to its discharge position has a sideward component and an upward component.

3. A conveyer according to claim 1 or 2 characterized in that each movable catching rail (8) comprises a fixed bar portion (20) and a movable bar portion (21), both portions being provided with a continuous flexible plastic profile (24) which functions as a hinge between the two bar portions spaced from each other, in which the movable bar portion constitutes the tongue (9) at the free end of the catching rail.

4. A conveyer according to claim 3 characterized in that the tongue (9) at the free end of each movable catching rail (8) is mounted at an end of two braces (25) the other ends of which are connected to a common arm (26) rotatable around a shaft (27) having an axis (D) which cuts the pivotal portion of the catching rail under an angle with a vertical (E) to the catching rail.

5. A conveyer according to claim 2 characterized in that the tongue (9) at the free end of each movable catching rail (8) is mounted on a swivelling parallelogram-linkage (31) such that the tongue (9) of said rail is capable of being displaced horizontally and vertically.

* * * * *